Sept. 23, 1947.      S. S. SCHNEIDER ET AL      2,427,747
INDUCTION HEATING APPARATUS FOR BRAZING FILLETS
Filed July 7, 1944
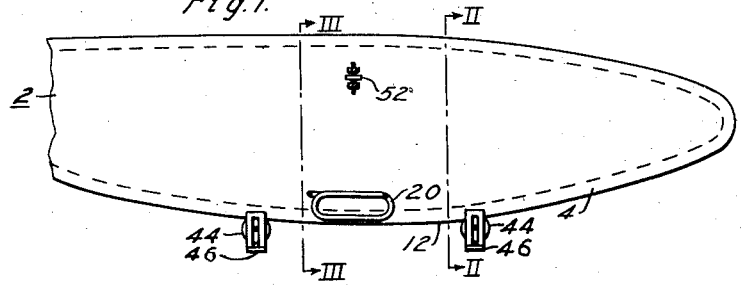
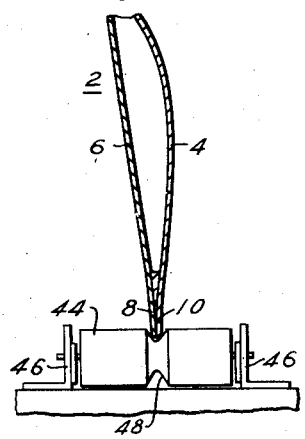
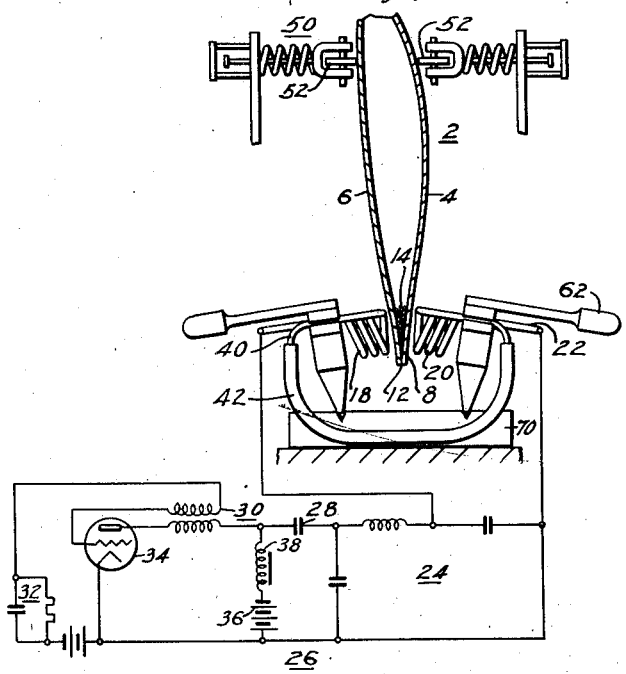
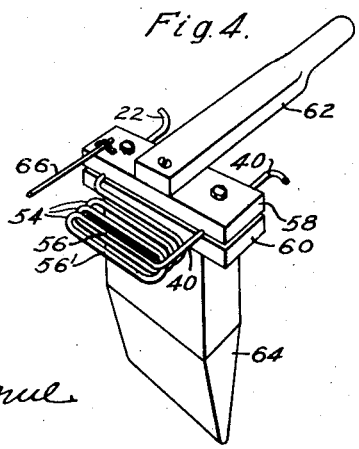
WITNESSES:
INVENTORS
Stanley S. Schneider and
Warren D. Kinsman.
BY
ATTORNEY Patented Sept. 23, 1947

2,427,747

UNITED STATES PATENT OFFICE 2,427,747

INDUCTION HEATING APPARATUS FOR BRAZING FILLETS

Stanley S. Schneider, Lansdowne, and Warren D. Kinsman, Catonsville, Md., assignors to Westinghouse Electric Corporation, East Pittsburgh, Pa., a corporation of Pennsylvania Application July 7, 1944, Serial No. 543,787

1 Claim. (Cl. 219—13)

Our invention relates broadly to induction heating apparatus of a type including tube-oscillator equipment. In a more limited sense, our invention is directed to brazing a fillet inside a fold, seam weld or similar joint by the use of inductively-produced heat; and, more specifically, our invention is directed to the end of adding strength and rigidity to a fabricated airplane propeller having a seam-welded edge, by brazing a copper-alloy inside the joint, at the weld, during the manufacture of the propeller.

A primary object of our invention is to provide a reinforcing brazed fillet in a seam weld along a sharp edge of a propeller blank.

A purpose of our invention is to provide a means and method for flowing reinforcing brazing compound or material at a seam weld or joint between thin sheet steel without causing significant or objectionable warpage, distortion, burning or scale formation when the brazing is done in open air.

In a form of our invention, the object to be brazed is moved relatively with respect to an induction heating means which is in the form of a pair of spaced coacting coreless induction heating coils. The coils are so disposed with respect to the moving object, and are so energized, that heat is induced in its edge to a considerably less degree than that inductively introduced in the slightly spaced walls of the object, adjacent the edge, to which the fillet is to be applied.

In the preferred form of our invention, this is obtained by passing the object through a space-attenuated pulsating magnetic field, with the edge of the object in the relatively weaker part of the field. Such a field is created by having the magnetic fields produced by each coil in opposition, and by sloping the facing coil end-turns if necessary. Preferably the heat is concentrated in a small part of the object at any time, so as to heat this area to brazing temperatures as quickly as practicable for commercial production. A brazing compound at the edge formed by the separating steel walls of the object, will be melted, and upon solidifying will form a reinforcing fillet brazed to the steel along the edge.

Other features, innovations, methods, and advantages of our invention will be discernible from the following description and attached drawing of a form thereof. In the drawing, which is schematic and not to scale:

Figure 1 is a partial elevational view of an embodiment of our invention;

Figs. 2 and 3 are, respectively, partial transverse sectional views substantially on the lines II—II and III—III of Fig. 1; and Fig. 4 is a perspective view of a heating tool having an induction heating coil, according to our invention.

Referring to the drawing, an elongated blank 2 of a propeller blade comprises a pair of side walls 4 and 6 which diverge from a border or edge 8, the side walls being seam-welded or otherwise continuously secured together for forming the edge, so as to form an abutment-joint 10 therebetween. The abutting portions of the joint extend for a short, but not necessarily uniform, distance from the extreme tip 12 of the edge 8. Upwardly beyond the edge, the side walls 4 and 6 are divergent and provide a hollow inside the blank with a narrow groove at the edge. For reinforcing the blade-edge, which may later be trimmed or otherwise finished, a fillet is provided in the groove between the side walls, inside the blade. To this end, brazing material or compound 14 is fairly evenly distributed in the groove, preliminary to brazing, and the material heated to brazing temperatures by a furnace of the magnetic induction heating type.

The furnace comprises a pair of coreless, or air-core, oblong induction heating coils 18 and 20 having end-turns facing each other, and spaced to provide a work-receiving passage therebetween. Preferably the coils are relatively small as compared to the object or blank which they are to heat, so as to provide a hot spot in the blank which will melt the brazing compound with power obtainable from a small-power tube-oscillator. We have found that satisfactory brazing is obtained when the coils 18 and 20 are so energized and wound that their magnetic fields are in opposition; that is, the magnetic field in each coil is of the same polarity at their facing ends at substantially every instant. For this kind of operation, we prefer to wind the coils in opposite directions and then connect them in series to the power supply, but it is understood that other obvious expedients may be used for obtaining such heat-inducing magnetic fields which are in opposition.

In our embodiment, the oppositely wound heating coils 18 and 20 have their far or outer terminals 22, with respect to the work passage, connected in series in a tank-circuit 24 of a tube-oscillator generator which is indicated in its entirety by the reference numeral 26. Since the exact details of the tube-oscillator form no part of our invention, it has been only generally shown in Fig. 3 as comprising the tank-circuit 24, a direct-current blocking capacitor 28, a feedback transformer 30, and a grid leak branch-circuit 32, suitably connected to the electrodes of an oscillating tube 34 which is supplied by power from any suitable power source comprising a plate supply 36 in series with a high-frequency blocking inductor 38. The inner terminals 40 of the heating coils are connected in series by an insulated conductor 42, shaped so as not to interfere with the movement of the blade-blank between the heating coils.

We have found it desirable to pass the blade through the furnace so that the edge 8 does not become overheated while the portions of the side walls 4 and 6, contiguous to the portions forming the edge, are more intensely heated to a degree sufficient to melt the brazing compound. To this end the path of the edge 8 is predetermined by a plurality of longitudinally spaced rollers 44, supported by vertically adjustable supports 46. Each roller 44 is provided with a groove 48 for receiving a part of the edge 8. Guide means 50, comprising spring-pressed floating rollers 52 bearing on the side walls 4 and 6, near the top of the blank, are also provided. The various rollers support and guide the blade while it is moved through the work-receiving passage, and maintain the blade-edge 8 in a substantially predetermined position while passing between the heating coils.

Since the side walls 4 and 6, above the edge 8, are differently spaced along different parts of the blade, we have found it desirable to mount the heating coils in a fixture which permits the distance of the coil-ends from the side walls to be adjusted in accordance with the change in divergence of the side walls. We have found that this adjustment should be kept reasonably constant.

In Fig. 4, we show a construction of a heating coil which comprises a plurality of turns 54 terminating in the terminals 22 and 40, the former being relatively further from the work passage than the latter in operating position of the heating coil. The upper half 56 of the end turn closest to the work passage, is a straight section and the terminal end 40 is bent backward therefrom, so as to be substantially parallel to the other terminal end 22 and in the same plane so that the terminals can be clamped between a pair of clamping bars 58 and 60, for supporting the coil. The upper clamping bar 58 is provided with a handle 62 which extends away from the work passage end of the coil so that the coil can be pivoted on the edge of any suitable sharp support 64 depending from the lower clamping bar 60. Along lines within the coil, parallelling the conductor 56, the field intensity may be considered to be substantially constant.

We have satisfactorily put a fillet in the edge of a propeller blade of several feet in length by passing it between a pair of heating coils, each comprising about 3½ turns of ¼ inch O. D. copper tubing, each of the coils being oblong in section with a long side of 3 inches and a short side of ¾ of an inch. The blade side walls were made of special air-hardened steel 40 mils thick and were brazed while moving at a rate of 25 feet per hour, the brazing material comprising a copper alloy in the form of small pellets, about the size of the head of a pin, mixed with a powdered flux to suitable proportions for satisfactory brazing, as is common. The brazing material was placed fairly evenly along the edge of the blade which was passed between coils energized with a load current of approximately 675 amperes derived from a 50 kw. tube-oscillator operating at a frequency of about 500,000 cycles. The coil axes were maintained at an angle to the horizontal such that each coil end turn, at the work-passage, was almost parallel and close to the portion of the associated side wall in contact with the brazing material passing thereby. The upper conductors 56 of the coil end-turns were parallel and close to the proximate side wall at the point where heat was to be applied. The lower horizontal conductors 56' of such coil end-turns were below the seam weld, spaced further from the proximate side-wall than the associated upper conductors 56. This relative position of the coils with respect to the blank was maintained throughout the traverse of the furnace by the blank so that the same coupling between the coils and side walls was maintained at all times even though the contour or shape of the side walls varied along the length of the blade.

Through experimentation, we found that it is desirable to maintain this coupling between the side walls and the heating coils for treating an object such as described. If desired, an adjustable feeler 66 may be provided on the upper clamping bar 58, extending forwardly toward the work-passage end of the coil, for serving as a sensible indication to an operator through contact of the tip of the feeler with a side-wall or its position with respect thereto. The pivot edge of the support 64 may be placed in a groove of a block 70, selected for the job at hand.

Magnetizing the heating coils in opposition is an important part of our invention. By concentrating the heat in a relatively small spot in line with the brazing compound, while the blade-blank is travelling through the induction heating means, the brazing compound is quickly heated to brazing temperatures without unnecessarily heating surrounding material, and solidifies after passing the coils. The edge 8 of the blade does not get as hot as the portions of the side walls 4 and 6, which are in contact with the brazing compound.

Our experiments have shown that burning of the edge is prevented in the structure herein described by operating in the manner described; whereas the edge was burned or buckled when the coils were energized so their magneto-motive forces were additive although other conditions were the same.

While we have described our invention in a form which we believe constitutes a preferred adaptation of our invention, it is obvious that the principles of our invention can be otherwise applied, and the structures of our invention modified accordingly.

We claim as our invention:

Brazing apparatus of a type described for brazing a fillet in the edge between two spaced sloping walls of a hollow narrow elongated object, comprising a pair of spaced coreless induction heating coils having facing upstanding coil-ends spaced from each other to provide a path therebetween through which the edge of an object may pass, said coils having their axes in angular relation and their facing coil-ends divergent, whereby said path is transversely divergent, said coils being so wound and connected as to cause the fields at facing coil-ends to be of the same magnetic polarity at substantially any instant, high frequency energizing for magnetizing said coils sufficiently to introduce heat for melting brazing compounds inside said walls, along said edge, guiding means comprising a roller for positioning the edge-portions of said walls during movement of the object between said coils so that the extreme tip of the object is beyond the coil-ends and is heated less than the brazing compound, and guiding means for maintaining a substantially predetermined distance between each coil and the proximate wall of the object.

STANLEY S. SCHNEIDER.
    WARREN D. KINSMAN.

REFERENCES CITED

The following references are of record in the file of this patent:

UNITED STATES PATENTS

| Number | Name | Date |
|---|---|---|
| 1,566,500 | Northrup | Dec. 22, 1925 |
| 2,052,010 | Bailey | Aug. 25, 1936 |
| 2,316,506 | Doelker | Apr. 13, 1943 |
| 1,988,827 | Bennett | Jan. 22, 1935 |
| 2,231,888 | Couch | Feb. 18, 1941 |
| 970,488 | Gehrkens | Sept. 20, 1910 |
| 2,182,341 | Hulster | Dec. 5, 1939 |
| 2,205,424 | Leonard | June 25, 1940 |
| 2,280,337 | McKee | Apr. 21, 1942 |
| 1,915,047 | Blakeslee | June 20, 1933 |

FOREIGN PATENTS

| Number | Country | Date |
|---|---|---|
| 493,992 | France | May 17, 1919 |

OTHER REFERENCES

The Welding Engineer, July, 1943.

Chestnut, "Induction heat is $I^2R$" Steel, August 30, 1943.

Certificate of Correction

Patent No. 2,427,747.  September 23, 1947.

STANLEY S. SCHNEIDER ET AL.

It is hereby certified that error appears in the printed specification of the above numbered patent requiring correction as follows: Column 4, line 69, after "energizing" insert *means*; and that the said Letters Patent should be read with this correction therein that the same may conform to the record of the case in the Patent Office.

Signed and sealed this 30th day of December, A. D. 1947.

[SEAL]

THOMAS F. MURPHY,
*Assistant Commissioner of Patents.*